US006312303B1

(12) United States Patent
Yaniv et al.

(10) Patent No.: US 6,312,303 B1
(45) Date of Patent: Nov. 6, 2001

(54) ALIGNMENT OF CARBON NANOTUBES

(75) Inventors: Zvi Yaniv; Richard Lee Fink, both of Austin, TX (US)

(73) Assignee: SI Diamond Technology, Inc., Austin, TX (US)

( * ) Notice: Subject to any disclaimer, the term of this patent is extended or adjusted under 35 U.S.C. 154(b) by 0 days.

(21) Appl. No.: 09/356,145

(22) Filed: Jul. 19, 1999

(51) Int. Cl.[7] .................................. H01J 9/00; H01J 9/24
(52) U.S. Cl. ............................................................. 445/24
(58) Field of Search ............................. 313/24, 310, 336, 313/309, 351; 428/364, 367, 366, 398; 427/600, 75, 212

(56) References Cited

U.S. PATENT DOCUMENTS

| 4,160,046 | * | 7/1979 | Okumura | 427/600 |
| 4,701,024 | * | 10/1987 | Kobayashi et al. | 350/331 R |
| 5,512,368 | * | 4/1996 | Harmer et al. | 428/364 |
| 6,057,637 | * | 5/2000 | Zettl et al. | 313/310 |

OTHER PUBLICATIONS

Markets For Products Using SPD Technology, "Smart Windows," available via the Internet at http://www.refr-spd.com/markets-f.html#displays, pp. 1–4.
Research Frontiers Incorporated, "Light Control Technology for the 21st Century and Beyond," available via the Internet at http://www.refr.spd.com/index-f.html, pp. 1–2.
SPD Product Demonstrations, available via the Internet at http://www.refr-spd.com/demo-f.html, pp. 1–3.
Research Frontiers Incorporated, "Current Licenses," availabel via the Internet at http://www.refr-spd.com/licensees-f.html, pp. 1–2.
L. A. Chernozatonskii et al., "Influence of external factors on electron field emission from thin-film nanofilament carbon structures," *J. Vac. Sci. Technol. B*, May/Jun. 1996, pp. 2080–2082.
Phillip G. Collins et al., "A sample and robust electron beam source from carbon nanotubes," *Appl. Phys.*, vol. 69, No. 13, Sep. 1996, 3 pp.
S. Uemura et al., "39.3: Carbon Nanotube FED Elements," *Society for Information Display*, First Edition, May 1998, pp. 1052–1055.
Yahachi Saito et al., "Field Emission from Carbon Nanotubes and Its Application to FED Elements," *Workshop Digest of the 18th International Display Research Conference*, Asia Display 1998.

* cited by examiner

Primary Examiner—Kenneth J. Ramsey
Assistant Examiner—Mariceli Santiago
(74) Attorney, Agent, or Firm—Kelly K. Kordzik; Winstead Sechrest & Minick, P.C.

(57) ABSTRACT

Carbon nanotubes are aligned within a host phase of a material that has molecules that will align under a certain influence. When the host molecules become aligned, they cause the carbon nanotube fibers to also become aligned in the same direction. The film of aligned carbon nanotubes is then cured into a permanent phase, which can then be polished to produce a thin film of commonly aligned carbon nanotube fibers for use within a field emission device.

26 Claims, 5 Drawing Sheets

ALIGNMENT OF CARBON NANOTUBES

TECHNICAL FIELD

The present invention relates in general to display systems, and in particular, to field emission displays.

BACKGROUND INFORMATION

Carbon nanotubes have been demonstrated to achieve good electron field emission. However, in the prior art, the carbon nanotubes are deposited on the cathode in disorganized positions. FIG. 1 illustrates such a cathode 100 with a substrate 101 and an electrode 102. Illustrated are carbon nanotubes 103 deposited on electrode 102 in such disorganized positions. As a result of the random organization of the carbon nanotube fibers, the efficiency of the electron emission is impacted to be less than possible.

Therefore, there is a need in the art for a method of aligning such carbon nanotubes to improve the efficiency of the electron emission therefrom.

SUMMARY OF THE INVENTION

The present invention addresses the foregoing need by providing a method for aligning carbon nanotubes within a host phase. Once the carbon nanotubes are aligned, the host phase is then subjected to a binding process to make the alignment of the carbon nanotubes permanent. Thereafter, the surfaces of the host phase can be polished resulting in substantially vertically aligned carbon nanotubes within a thin film, which can then be used within a cathode structure to produce a field emission device, including a display.

The foregoing has outlined rather broadly the features and technical advantages of the present invention in order that the detailed description of the invention that follows may be better understood Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION

Figure 1:
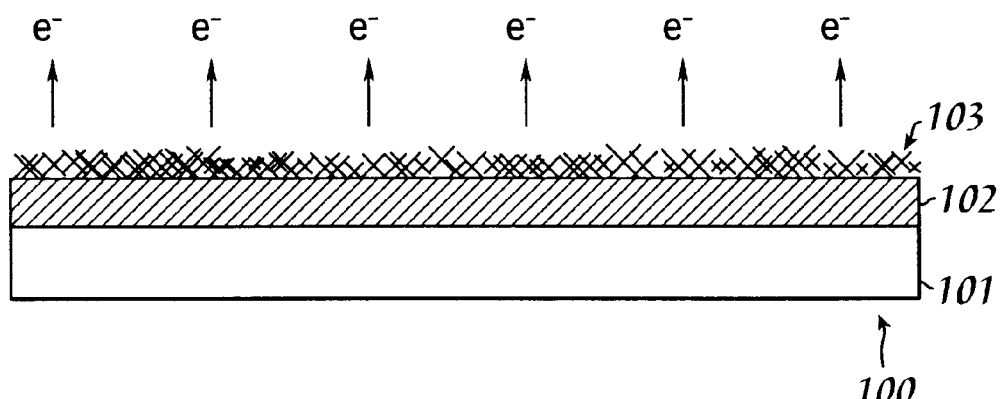
FIG. 1 illustrates a prior art cathode using unaligned carbon nanotubes.
Figure 2:
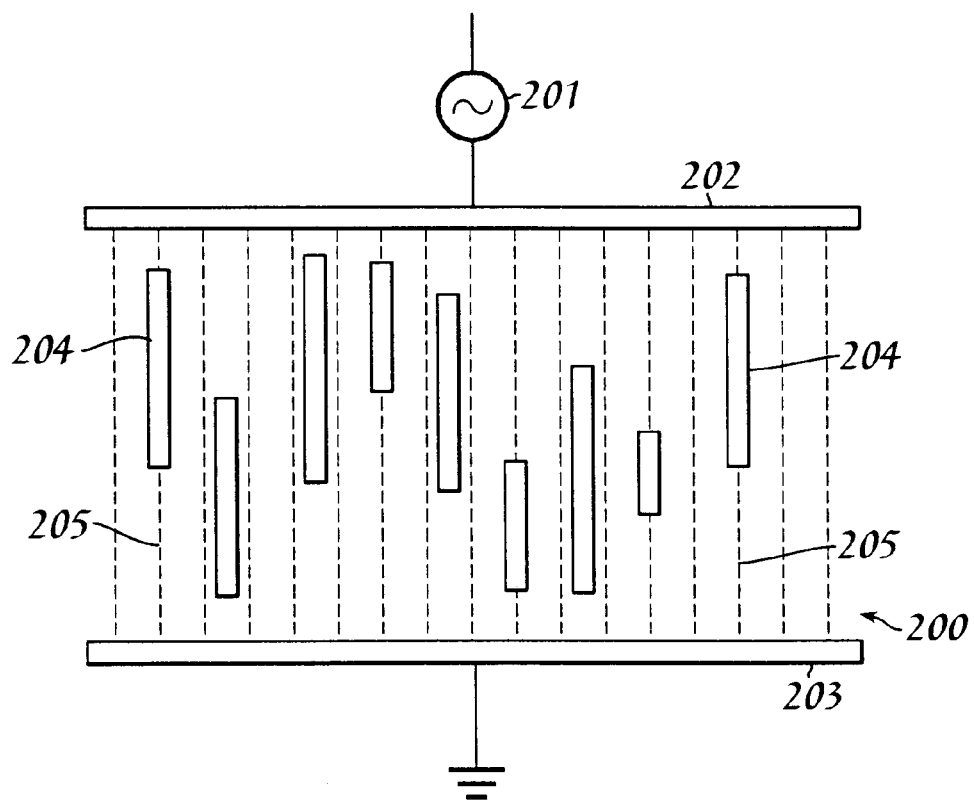
FIG. 2 illustrates carbon nanotubes aligned within a host phase.
Figure 3:
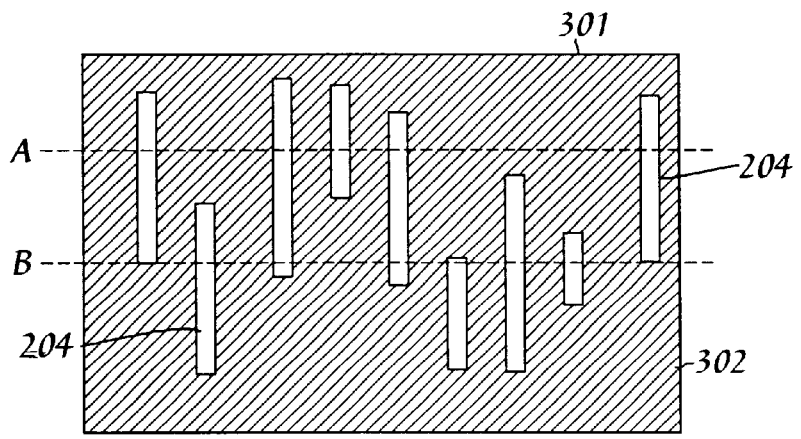
FIG. 3 illustrates binding of the host phase.
Figure 4:
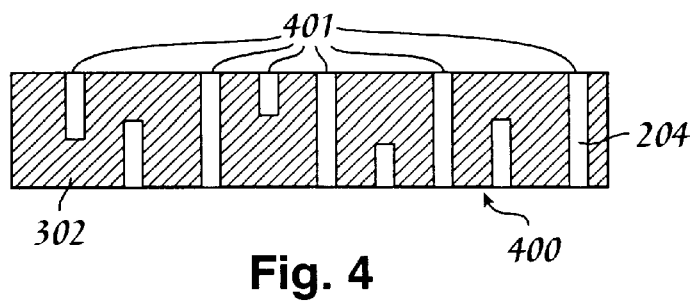
FIG. 4 illustrates a thin film including vertically aligned carbon nanotubes.

In the following description, numerous specific details are set forth such as specific host phases or display structures, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail.

Refer now to the drawings wherein depicted elements are not necessarily shown to scale and wherein like or similar elements are designated by the same reference numeral through the several views.

The present invention exploits the fact that carbon nanotubes are similar to elongated particles (molecules), which can be placed with a host phase of ordered elongated particles. Such ordered elongated particles could be liquid crystals, ordered metal fibers in a liquid under a magnetic or electric field, geometrically anizotropic particles, anizotropic crystals (elongated) possessing a strong dipole moment, etc. By selecting the size of the nanotubes with respect to the host phase, the present invention aligns the carbon nanotube fibers by aligning the particles of the host phase.

Referring to FIGS. 2–4 and 7, as an example, the host phase 200 could be a liquid crystal having liquid crystal molecules 205. The liquid crystal can also include an ultraviolet (UV) curable binder that hardens the liquid crystal when exposed to UV light, as is further discussed below. The host phase may alternatively be a solution of elongated crystals in an isotropic liquid medium (oil). Another alternative host phase would be a long chain of polymer molecules aligned with each other through a mechanical means, such as rubbing. Such "rubbing" is a commonly used process within the liquid crystal art. Such a rubbing process is further discussed below. The carbon nanotubes 204 are disposed within the host phase (step 701) and initially will likely be unaligned with each other (not shown) similar to as that shown in FIG. 1. This is done within a container (not shown) between electrodes 202 and 203. Electrode 203 is grounded while electrode 202 is coupled to a power source 201. Assume for this example that the liquid crystal molecules are long and heavy ($\geq 500$ angstroms). If the nanotubes 204 are approximately 50 micrometers in length, a field of 50–60 volts will align the host molecules 205 and eventually the nanotubes 204 (step 702).

As an alternative, a substrate may be deposited at the bottom of the host phase 200 and above the electrode 203 so that the host phase with the nanotubes is already deposited on a substrate instead of performing the mounting step 705 described below.

Figure 8:
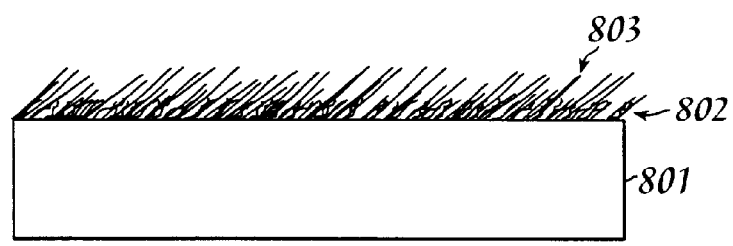
FIG. 8 illustrates an alternative embodiment for the present invention.

Another means for aligning the host phase is to place the host phase in physical contact with an alignment layer, such as illustrated in FIG. 8. On a substrate 801, the alignment layer 802, which can consist of long chain polymers in a semi-solid form are deposited, and then rubbed or combed in one direction to align the polymers in a specified direction. Physical contact of the host phase 803 with the alignment layer 802 aligns the molecules in the host phase in the specified direction, this direction being dependent on many parameters. Alignment of the host phase in the specified direction induces alignment of the nanotubes disposed within the host phase.

As noted previously, the host phase can contain an ultraviolet (UV) curable binder 302 (or other curable monomers, for example by heat, etc.). By shining an ultraviolet light, for example, on the organized aligned phase 301, the process produces a solid film of aligned carbon nanotubes 204. This process is referred to as binding the alignment (step 703).

Thereafter, the solid film can be sliced, for example along dashed lines A and B, and/or one or more of the surfaces polished (step 704) to obtain a thin film 400 of organized carbon nanotubes to be used as a cold electron source for field emission applications. Once an electric field is produced, the carbon nanotubes 204 will emit from their ends 401.

Figure 9:
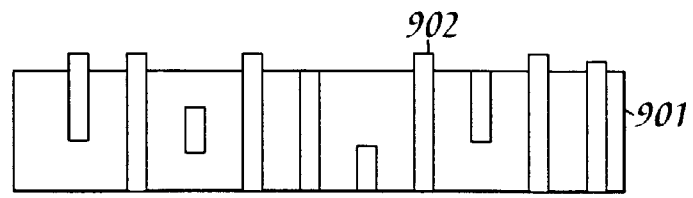
FIG. 9 illustrates an etching step within an alternative embodiment of the present invention.
Figure 11:
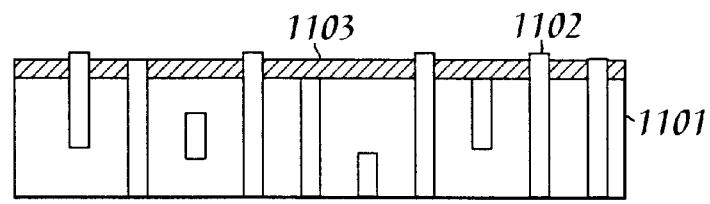
FIG. 11 illustrates application of a metal layer on the host phase.

Referring to FIG. 9, step 704 may also alternatively include an etching phase, whereby a portion of the host phase 901 is etched back without etching the nanotubes. This is possible since the nanotubes are made of a carbon or graphic material that is more resistant to etching. As a result, this process will expose portions of the nanotubes 902. It should be noted that the etching step can be performed in combination with or alternatively to the polishing process.

Figure 10:
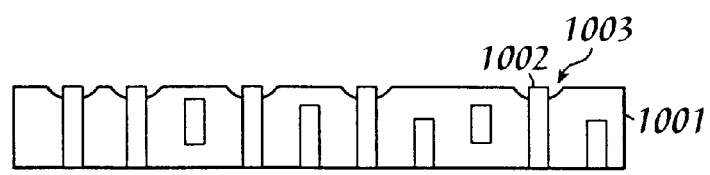
FIG. 10 illustrates another etching step within an alternative embodiment of the present invention.

An alternative etching process is illustrated in FIG. 10, whereby a more directional etching process is performed, usually through the use of a mask (not shown), to selectively etch wells 1003 within the host phase 1001 around selected carbon nanotubes 1002. Again, the result is that portions of the nanotubes 1002 are exposed.

Figure 12:
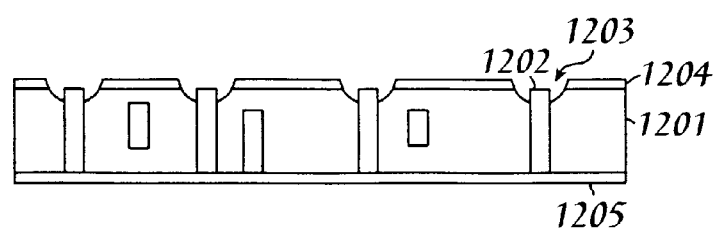
FIG. 12 illustrates an alternative embodiment of the present invention.

Another alternative embodiment of the present invention is illustrated in FIG. 12 where the nanotubes 1202 are contacted by a conductive layer 1205 on the bottom side. A conductive layer 1204 is deposited on the top side. Wells 1203 are then etched down into the top side conductive layer 1204 and the host phase 1201 such that the top conductive layer 1204 is electrically isolated from the nanotubes 1202. Thus, the top conducting layer 1204 can be used as a gate control.

The exposing of the carbon nanotubes above the host phase can result in a better emission of electrons from the carbon nanotubes.

As an alternative to providing a conductive layer on the bottom of the host phase, a conductive layer 1103 can be deposited on top of the host phase 1101 after an etching process to expose portions of the nanotubes 1102. Naturally, the conductive layer is used to produce the electric field for emission of electrons from the carbon nanotubes 1102.

Alternatively, the host phase in each of the above embodiments can be doped to make the host phase conducting or semiconducting, thus eliminating the need for a conductive layer.

Figure 5:
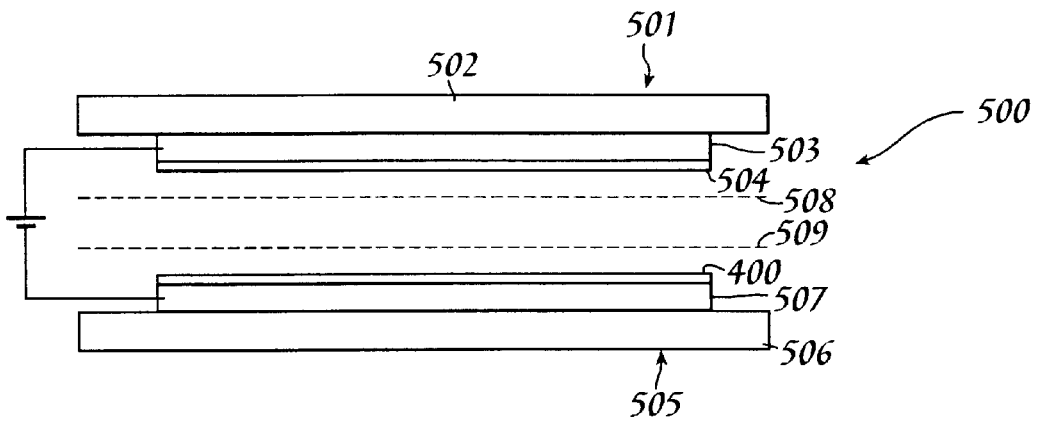
FIG. 5 illustrates a field emission device using the thin film of FIG. 4.

This is further shown by the field emission device 500 is FIG. 5. An anode 501 is made of a substrate 502, an electrode 503 and a phosphor 504. The cathode 505 includes a substrate 506, an electrode 507 and the thin film 400 discussed above. Upon the application of electric field, the carbon nanotubes will emit electrons. Any number of gate electrodes or extraction grids 508, 509 may optionally be implemented.

Such a field emission device 500 can be used in many applications, such as to produce single cathode pixel elements, to produce large billboard-like displays, or even smaller displays such as for computers The cathodes may be aligned in strips to produce a matrix-addressable display.

Figure 6:
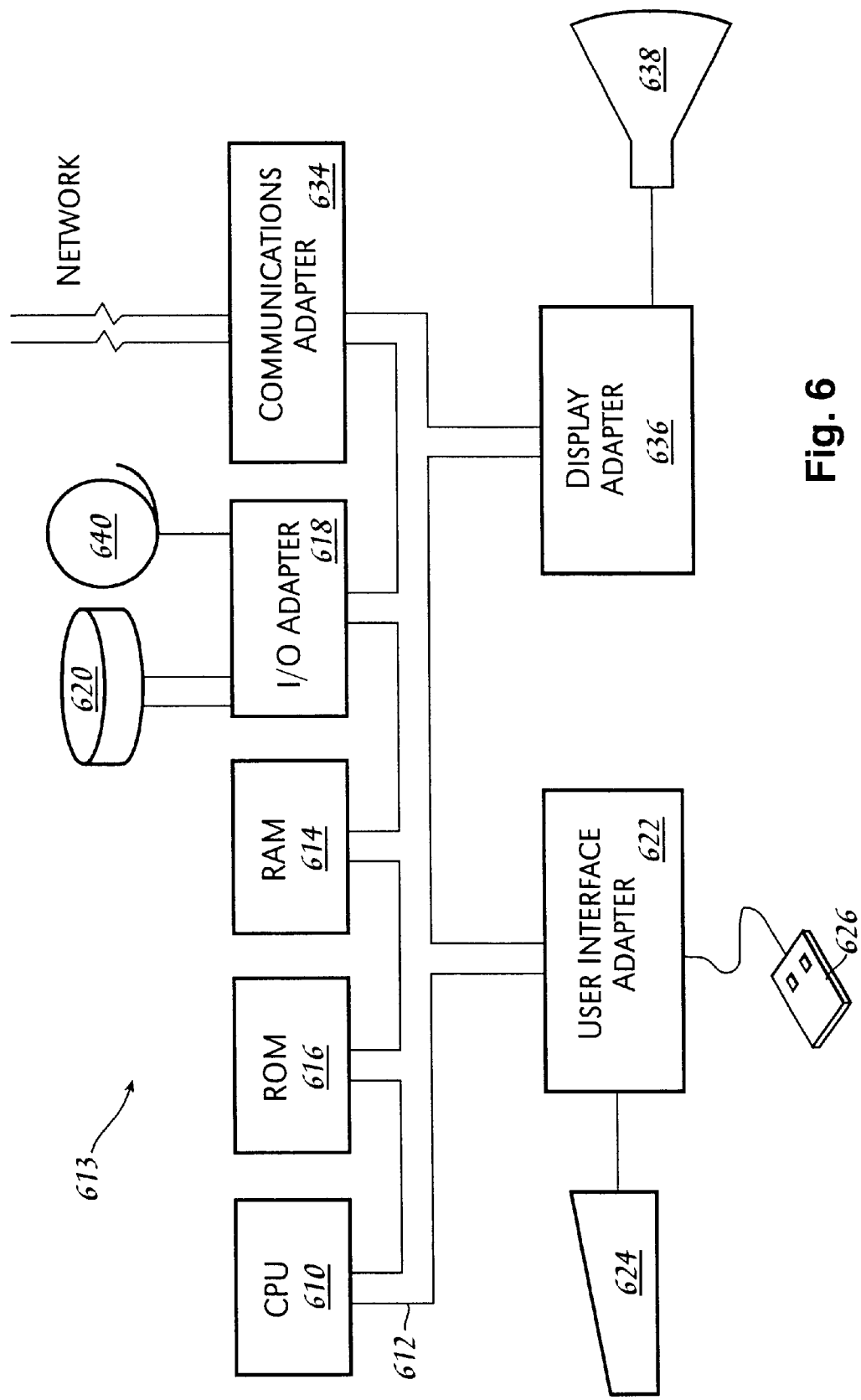
FIG. 6 illustrates a data processing system configured in accordance with the present invention.
Figure 7:
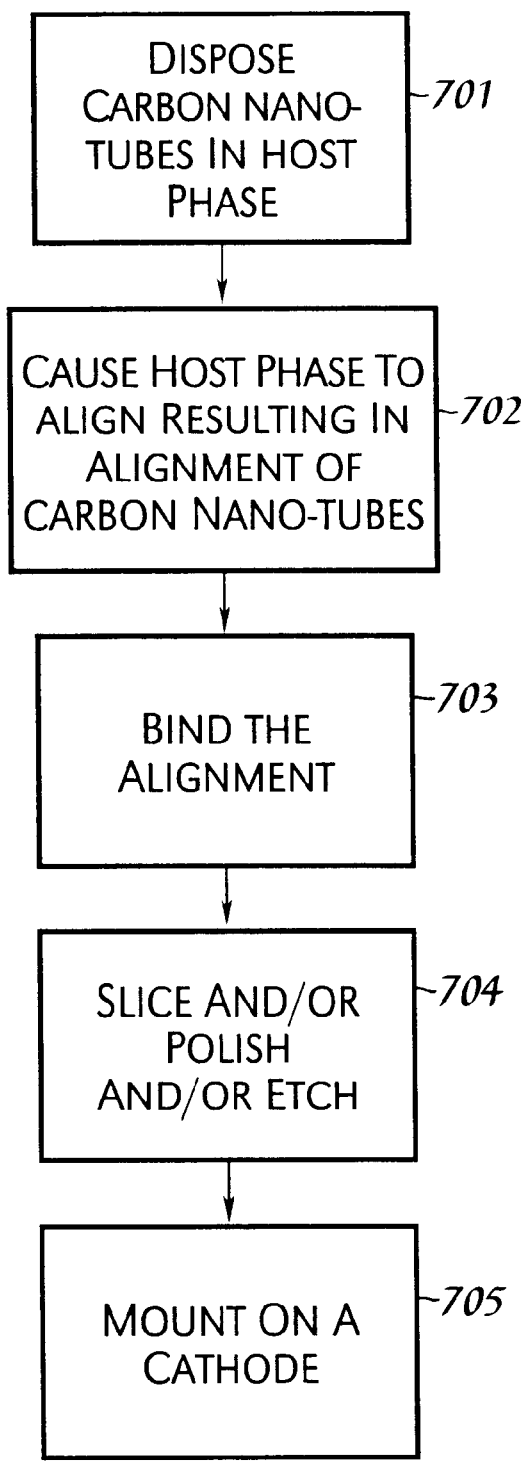
FIG. 7 illustrates a flow diagram of a process for aligning carbon nanotubes in accordance with the present invention.

FIG. 6 illustrates a data processing system 613 configured to use a display device made from the field emission devices described in FIG. 5, which illustrates a typical hardware configuration of workstation 613 in accordance with the subject invention having central processing unit (CPU) 610, such as a conventional microprocessor, and a number of other units interconnected via system bus 612. Workstation 613 includes random access memory (RAM) 614, read only memory (ROM) 616, and input/output (I/O) adapter 618 for connecting peripheral devices such as disk units 620 and tape drives 640 to bus 612, user interface adapter 622 for connecting keyboard 624, mouse 626, and/or other user interface devices such as a touch screen device (not shown) to bus 612, communication adapter 634 for connecting workstation 613 to a data processing network, and display adapter 636 for connecting bus 612 to display device 638. CPU 610 may include other circuitry not shown herein, which will include circuitry commonly found within a microprocessor, e.g., execution unit, bus interface unit, arithmetic logic unit, etc. CPU 610 may also reside on a single integrated circuit.

Although the present invention and its advantages have been described in detail, it should be understood that various changes, substitutions and alterations can be made herein without departing from the spirit and scope of the invention as defined by the appended claims.

What is claimed is:

1. A method for aligning geometric anisotropic particles, comprising the steps of:

disposing the geometric anisotropic particles in a host phase; and causing the host phase to induce alignment of the geometric anisotropic particles.

2. The method as recited in claim 1, wherein the host phase is aligned by mechanical contact with an alignment layer.

3. The method as recited in claim 1, wherein the geometric anisotropic particles are carbon nanotubes.

4. The method as recited in claim 1, wherein the geometric anisotropic particles are elongated and aligned parallel to each other such that their long axes are parallel to each other.

5. The method as recited in claim 1, wherein the causing step further induces molecules in the host phase to align which physically causes the geometric anisotropic particles to align with the host phase molecules.

6. The method as recited in claim 1, further comprising the step of:

binding the aligned host phase.

7. The method as recited in claim 6, further comprising the step of depositing a conductive layer on the host phase and around the exposed portions of the geometric anisotropic particles.

8. The method as recited in claim 6, further comprising the step of etching the host phase to expose portions of the aligned geometric anisotropic particles.

9. The method as recited in claim 6, further comprising the step of polishing the binded and aligned host phase.

10. The method as recited in claim 1, wherein the host phase is aligned by an external force.

11. The method as recited in claim 10, wherein the external force is a mechanical force.

12. The method as recited in claim 10, wherein the external force is a magnetic force.

13. The method as recited in claim 10, wherein the external force is an electrical force.

14. The method as recited in claim 10, wherein the external force is an optical force.

15. A method of manufacturing a field emission device, comprising the steps of:

disposing carbon nanotubes into a host phase; and causing the host phase to align resulting in alignment of the carbon nanotubes.

16. The method as recited in claim 15, wherein the host phase is aligned by an external force.

17. The method as recited in claim 15, wherein the causing step further comprises the step of depositing an alignment layer on a substrate and then disposing the host phase onto the alignment layer in mechanical contact resulting in alignment of the carbon nanotubes disposed within the host phase.

18. The method as recited in claim 17, wherein the alignment layer comprises long chain polymer molecules aligned with each other.

19. The method as recited in claim 15, further comprising the step of:

binding the aligned host phase.

20. The method as recited in claim 19, wherein the causing step further causes molecules in the host phase to align which physically causes the carbon nanotubes to align with the host phase molecules.

21. The method as recited in claim 19, further comprising the step of:

slicing the host phase substantially perpendicular to the alignment of the carbon nanotubes.

22. The method as recited in claim 21, further comprising the step of:

polishing a surface of the host phase so that some of the carbon nanotubes have their ends exposed.

23. The method as recited in claim 19, further comprising the step of:

polishing a surface of the host phase.

24. The method as recited in claim 19, further comprising the step of:

mounting the host phase with the aligned carbon nanotubes onto a substrate.

25. The method as recited in claim 24, further comprising the steps of:

disposing an anode opposite of the mounted host phase; and operating an electric field between the anode and the mounted host phase.

26. The method as recited in claim 19, further comprising the step of etching the host phase to expose portions of the carbon nanotubes above the surface of the etched host phase.

* * * * *